F. R. COCHRAN.
NUT LOCK.
APPLICATION FILED JUNE 16, 1909.
960,507.
Patented June 7, 1910.
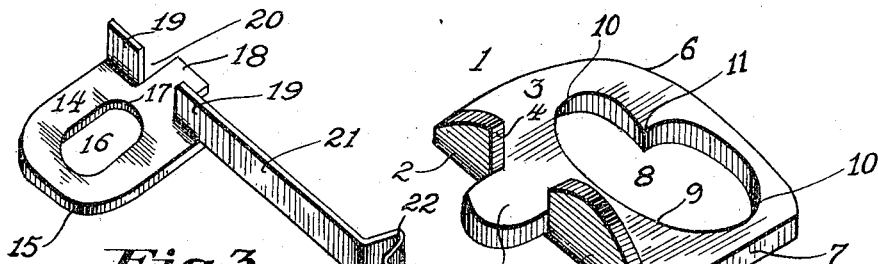
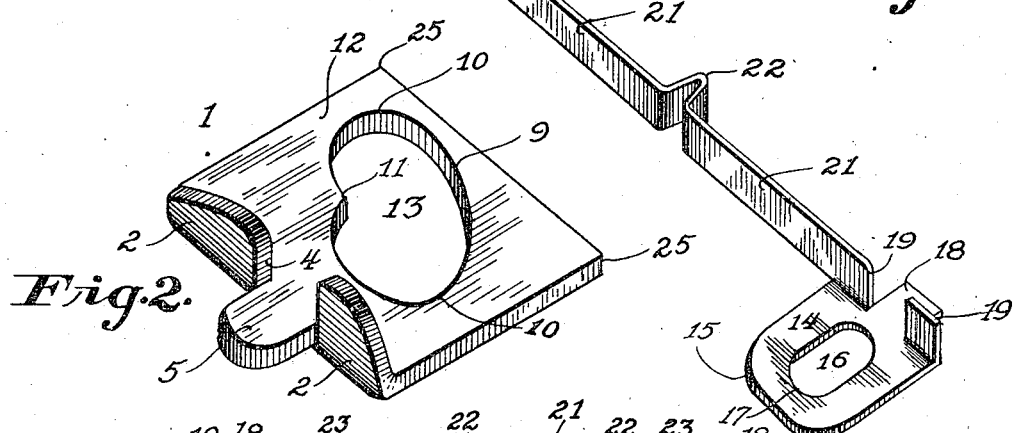
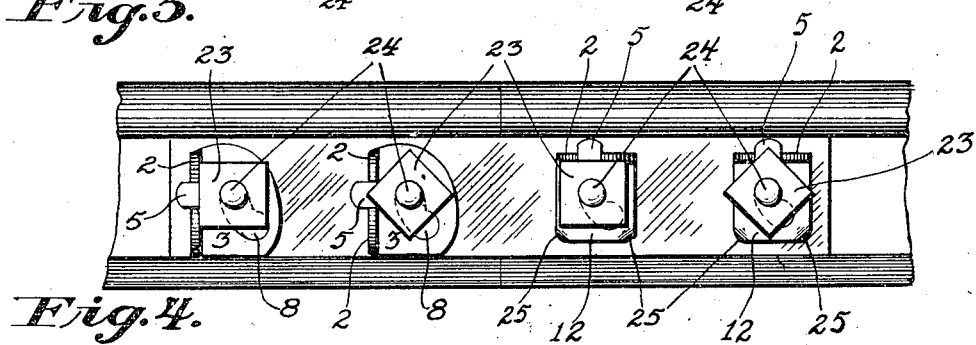
Witnesses
Inventor
Fred R. Cochran,
By E. E. Vrooman,
his Attorney.

UNITED STATES PATENT OFFICE.

FRED R. COCHRAN, OF WINDSOR, NOVA SCOTIA, CANADA.

NUT-LOCK.

960,507.     Specification of Letters Patent.     Patented June 7, 1910.

Application filed June 16, 1909. Serial No. 502,560.

*To all whom it may concern:*

Be it known that I, FRED R. COCHRAN, a subject of the King of England, residing at Windsor, Nova Scotia, Canada, have invented certain new and useful Improvements in Nut-Locks, of which the following is a specification, reference being had therein to the accompanying drawing.

This invention relates to nut locks, and the principal object of the same is to provide a washer adapted to be interposed between the work to be held and a nut and provided with means for preventing the rotation of the nut to a loose position, said washer being also provided with means whereby it may be manually moved relative to the nut to permit the nut to be loosened when necessary or desirable.

In carrying out the objects of the invention generally stated above it will, of course, be understood that the essential features of the same are susceptible of changes in details and structural arrangements, a few simple and practical embodiments of which are shown in the accompanying drawings, wherein—

Figure 1 is a perspective view of the improved nut locking washer. Fig. 2 is a similar view of a slight modification thereof. Fig. 3 is a perspective view of a further embodiment of the invention, showing two of the locking washers coupled. Fig. 4 is a side view of a rail joint, showing the nuts thereof locked by means of washers made in accordance with the present invention. Fig. 5 is a similar view of a rail joint showing the nuts thereof locked by means of the embodiment of the invention shown in detail in Fig. 3.

Referring to said drawing by numerals, 1 designates a washer in its entirety, the same being preferably formed of sheet metal and having a rounded upstanding edge 2 which is bent at right angles to the flat body 3 of the washer. Said upstanding angular edge is slotted as indicated at 4 and from the base of the slot 4 a lip 5 projects outwardly, said lip being in the same plane with the body 3. The edge of the base opposite the upstanding portion 2 is preferably of a rounded tapering formation as indicated at 6, the arrangement being such that the washer, in its preferred embodiment shown in Fig. 1 has but one straight edge 7, said straight edge being at right angles to the upstanding portion 2. The intermediate portion of the body 3 is provided with an obliquely arranged opening 8 having rounding sides 9 and ends 10, one of said sides 9 being provided with an inwardly projecting pointed portion 11 which practically divides said slot into two chambers.

In Fig. 2 the plate 12 has been shown as of a rectangular shape, its slot 13 being arranged on an opposite angle to the slot of plate 3. In all other respects the type of washer shown in Fig. 2 is identical with that shown in Fig. 1.

In Fig. 3 two washers have been shown, said washers being of duplicate construction to provide a flat substantially rectangular body 14 having one end edge rounded, as at 15. Said washers are provided with a central longitudinal slot 16, the ends of which are rounded. At the end of said washers opposite the rounded end, they are provided with a central outstanding lip 18, arranged in the same plane as the body of the washers, and projecting from the base of the rear right angular upstanding flange 19 so as to provide a central slot 20 therein. The two washers shown in Fig. 3 are integral and are formed from a single sheet of metal, and are stamped or punched so as to provide the elongated coupling member 21 which is a continuation of the flange 19, said coupling member being crimped or bent at intervals to provide regularly spaced apart tapering notches 22.

In Fig. 4 of the accompanying drawings a rail joint has been shown in which the nuts 23 thereof are held in locked position by means of the single washers constructed in accordance with Figs. 1 and 2. Reading said figure from the left to the right, it will be observed that the first nut is held to its bolt 24 with one of its edges in binding engagement with the angular portion 2 of the body 3 of the washer. The next nut is held by having one of its corners projecting into the slot 4. In the next two showings of the nuts, the same are locked by means of a washer of the type shown in Fig. 2. The first nut is shown locked to its bolt by contact of one edge of the nut with the angular portion 2 of the body of the washer. In the second, the nut has one corner projecting through the slot 4. In both of these last two showings of the manner of locking the nut, the corners 25 of the body 12 have been shown bent inwardly so as to engage with cavities (not shown) in the fish plate. Obviously if the improved nut locking washer is used on a wooden surface, such points may be readily forced into the material.

In Fig. 5 a rail joint has been shown in which the nuts are locked to their bolts by means of the locking device shown in Fig. 3. In this form of the invention it will be seen that one of the outer nuts is locked by having its corner projecting through the slot 20. The other outer or end nut is held by having one of its straight edges in contact with the flange 19. One of the intermediate nuts is held by having its straight edge in contact with the flat surface of the coupling member 21, the other intermediate nut being held by having one of its corners projecting into one of the tapering notches 22.

In all the forms of the invention the washers are first placed upon the bolts with the said bolts projecting through the end portion of their slots farthest away from the upstanding edge or flange. The nut is then tightened upon the bolt, after which the washer may be forced in contact with the nut by means of a hammer or similar tool striking upon the projecting lips to force the washer to proper locking position, as will be obvious. To release the nuts, the washers may obviously be driven in an opposite direction and thus forced away from the nuts.

From the foregoing it will be seen that the invention is one that can be quickly stamped or punched from a single piece of material, the stamping or punching operation also properly shaping the same, thereby greatly cheapening its cost of production. And it will also be seen that through the use of the described guide slots, the washers will be properly guided to their locking or unlocking position, so as to expedite the operation of securing or releasing the nut.

What I claim as my invention is:—

1. A nut lock comprising a flat body provided with a guide slot, one edge of said body being upturned to form an abutment flange and provided with a central slot, and a lip projecting from said body at the base of said central slot and arranged in the same plane as the body.

2. A nut lock comprising a flat body provided with an intermediate guide slot, one edge of said body being upturned to form a nut engaging flange, said flange being provided with a slot for engagement with a corner of a nut, and said body being provided with an outstanding lip which projects therefrom at the base of the said last mentioned slot in said flange.

3. A nut lock comprising a flat body provided with a slot, one edge of said body being bent at right angles thereto and provided with a slot, said angular portion being adapted for engagement with the sides of a nut and the slot therein being adapted for engagement with a corner of a nut, and a lip projecting from said body at the base of said edge slot by means of which said body may be moved relative to the nut being held thereby.

4. A nut lock comprising two washers each having a flat slotted body and an angular end flange provided with a slot, a lip projecting from said body at the base of each flange slot, and a coupling member integral with the said flanges and provided with integral crimped holding notches.

In testimony whereof I hereunto affix my signature in presence of two witnesses.

FRED R. COCHRAN.

Witnesses:
HAROLD R. THORPE,
N. S. HUNTER.